United States Patent [19]
Ishimaru

[11] Patent Number: 5,947,218
[45] Date of Patent: Sep. 7, 1999

[54] POWER TAKE-OFF TRANSMISSION FOR A WORKING VEHICLE

[75] Inventor: Yoshitaka Ishimaru, Amagasaki, Japan

[73] Assignee: Kanzaki Kobyukoki Mfg. Co., Ltd., Hyogo-ken, Japan

[21] Appl. No.: 08/888,402

[22] Filed: Jul. 7, 1997

[30] Foreign Application Priority Data

Jul. 8, 1996 [JP] Japan .................................. 8-177950
Jul. 8, 1996 [JP] Japan .................................. 8-177951

[51] Int. Cl.$^6$ .................................................. B60K 17/28
[52] U.S. Cl. .................. 180/53.1; 74/15.2; 74/15.86; 74/665 G
[58] Field of Search ................. 180/53.1, 53.3, 180/247; 74/15.2, 15.86, 665 G, 665 GA, 665 T

[56] References Cited

U.S. PATENT DOCUMENTS 4,579,183  4/1986  Irikura et al. ........................... 180/53.1
5,046,994  9/1991  Hasegawa et al. ..................... 180/53.1

FOREIGN PATENT DOCUMENTS

2-247627  11/1980  Japan ..................................... 180/53.1
7-15784 Y2  4/1995  Japan .

*Primary Examiner*—Peter C. English
*Attorney, Agent, or Firm*—Sterne, Kessler, Goldstein & Fox P.L.L.C.

[57] ABSTRACT

A transmission casing, comprising a front casing and a rear casing, houses a transmission, comprising an input shaft whereto power is transmitted from an engine; a pair of axles whereto left and right running wheels of a vehicle are affixed; a running speed changing unit interlocking the pair of axles and the input shaft; a mid-PTO shaft to drive a working machine attached to a belly portion of the working vehicle; and a mid-PTO drive train interlocking the mid-PTO shaft and the input shaft. A PTO clutch mechanism is provided around a PTO transmission shaft so as to provide a condition where only the mid-PTO shaft is driven, a condition where only the rear-PTO shaft is driven, a condition where both PTO shafts are driven and a neutral condition where neither PTO shaft is driven. A brake unit is provided in the mid-PTO drive train to stop the mid-PTO shaft.

20 Claims, 11 Drawing Sheets

POWER TAKE-OFF TRANSMISSION FOR A WORKING VEHICLE

BACKGROUND OF THE INVENTION

1. Field of the Invention

The present invention relates to a transmission for selectively driving a working machine, like a mower, which is attached to the belly or the rear portion of a working vehicle, enabling a working machine attached to the belly portion thereof to be prevented from inertial idling.

2. Related Art

Japanese Utility Model Publication No. 7-15784, for example, discloses a conventional transmission for driving a working machine attached to the belly or the rear portion of a working vehicle. The transmission comprises a transmission casing and an output casino, attached to the bottom of the transmission casing, which supports a mid-PTO shaft. A rear-PTO drive train is located at the rear portion of a running speed changing unit in the transmission casing. The mid-PTO shaft is driven below the rear-PTO drive train. A rear-PTO clutch mechanism is separated from a mid-PTO clutch mechanism.

When the output casing supporting the-mid PTO shaft is separated from the transmission casing as described above, the joint surfaces of the transmission casing and the output casing must be ground to be smooth and a seal must be placed between them when joined. This results in an increase in: the number of necessary parts, the steps in the assembly process and the manufacturing cost. Additionally, the PTO transmission unit is disposed separately from the running transmission unit at the rear of the transmission casing, while a part of the rear-PTO drive train constituting the PTO transmission unit is used for a part of a mid-PTO drive train. Thus, the mid-PTO shaft is disposed near the rear of the transmission casing so as to enlarge the transmission mechanism for transmitting power to the working machine attached to the belly portion of the working vehicle. Also, since the output casing projects downwardly from the lower surface of the transmission casing, the ground clearance of the working vehicle is reduced. Further, since each of the rear-PTO and mid-PTO clutch mechanisms are separate, they each require a separate PTO clutch lever which is confusing for the operator.

Japanese Utility Model Publication No. 7-15784 also discloses a brake unit disposed in a drive train for a working machine to prevent a working machine attached to the belly of a working vehicle from inertial idling. The brake unit for prevention of inertial idling is disposed around the mid-PTO shaft in the output casing so as to be in line with the mid-PTO clutch mechanism disposed therearound. The brake unit for prevention of inertial idling is constructed so as to act when a mid-PTO clutch lever is turned off or a clutch pedal is trod.

However, the brake unit for prevention of inertial idling acts only when the mid-PTO clutch lever disengages the mid-PTO shaft or the clutch pedal is trod. Then, if the object to be driven is shifted from the mid-PTO shaft to the rear-PTO shaft, for example, as soon as the clutch pedal is depressed the idled mid-PTO shaft, which has been stopped, begins to rotate again by the inertial force of the working machine. Additionally, a link mechanism interlocking the brake for prevention of inertial idling and the clutch mechanism, which is located outside the transmission casing, must be positioned to avoid other link mechanisms and is liable to rust due to its exposure to dust or water, thereby causing inferior movement.

SUMMARY OF THE INVENTION

A first object of the present invention is to provide a transmission for a working vehicle which eliminates a separate output casing to house a mid-PTO shaft and includes a simple mid-PTO gear train so as to reduce the number of parts and the manufacturing cost. A second object thereof is to provide a transmission for a working vehicle which includes a simple construction for selectively driving a rear-PTO shaft or a mid-PTO shaft. A third object thereof is to provide a transmission for a working vehicle which positions a mid-PTO shaft as high as possible in order to increase the ground clearance at the transmission's lowest point. A fourth object thereof is to provide a transmission for a working vehicle which stops a mid-PTO shaft when the shaft is not used.

A transmission casing comprises a front casing and a rear casing which are separable. A transmission is so compactly constructed that the transmission casing houses an input shaft which receives power transmitted from an engine, a pair of left and right axles having running wheels attached thereto, a running speed changing unit interlocking between the pair of axles and the input shaft, a mid-PTO shaft for driving a working machine attached to the belly of the vehicle, and a mid-PTO drive train interlocking between the mid-PTO shaft and the input shaft. The mid-PTO shaft is housed in an expanded lower portion extending slantingly downward from a lower portion of the transmission casing so as to be eccentrically positioned in the lateral direction of the vehicle, thereby raising the lowest point of the vehicle with respect to the ground.

Also, in the transmission, a PTO clutch mechanism, which can provide a position to drive only a mid-PTO shaft, a position to drive only a rear-PTO shaft, a position to drive both PTO shafts, and a neutral position wherein neither PTO shaft is driven, is provided around a PTO transmission shaft so that the means for operating the PTO clutch mechanism comprises only one simple lever. A brake unit capable of stopping the mid-PTO shaft is also provided in the mid-PTO drive train so as to automatically stop the mid-PTO shaft when it is not used.

DETAILED DESCRIPTION OF THE PREFERRED EMBODIMENTS

Figure 1:
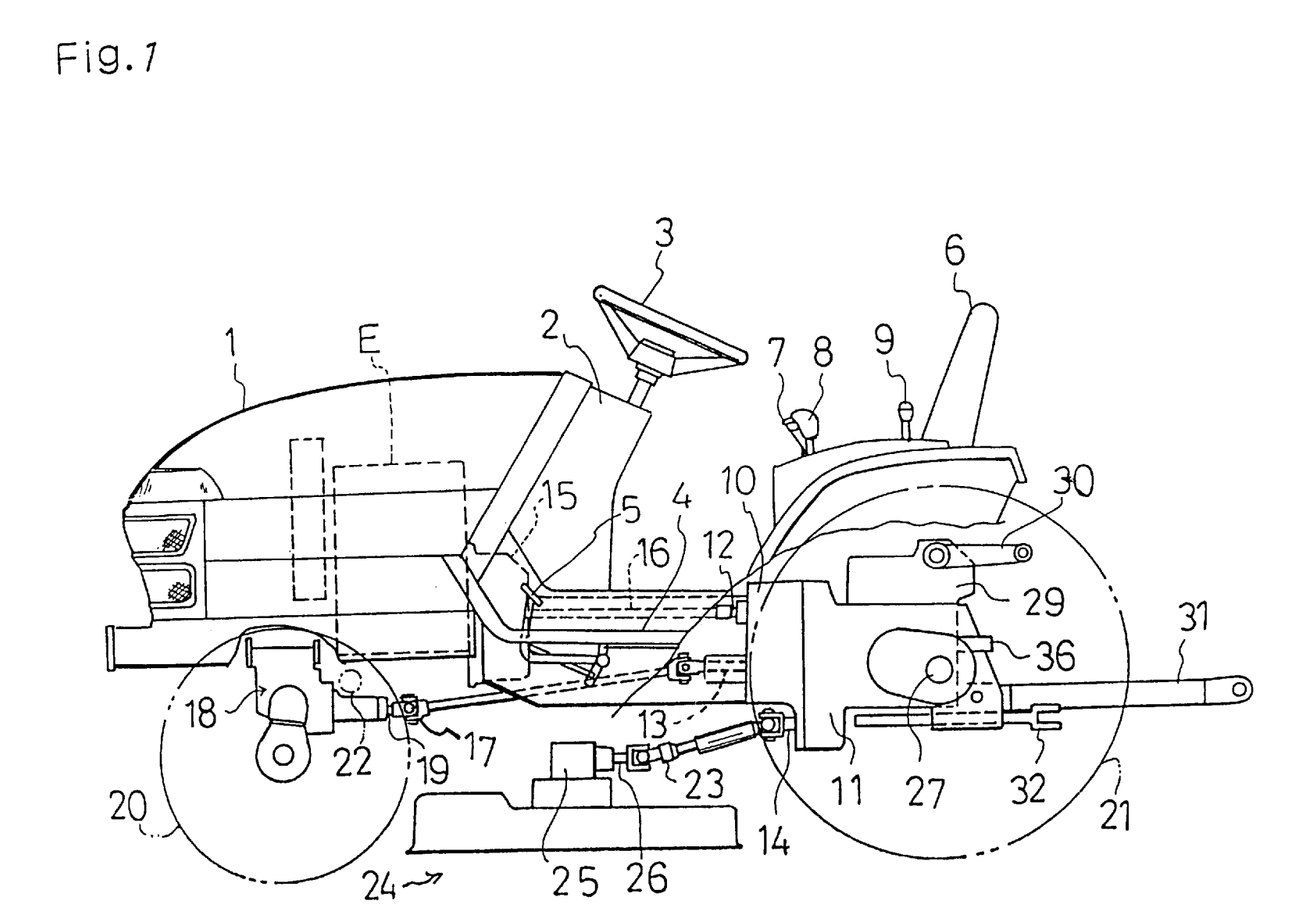
FIG. 1 is a side view of a working vehicle of the present invention.

Explanation will first be given of an entire construction of a working vehicle having a transmission according to the present invention, in accordance with FIG. 1, in which an engine E is mounted in a bonnet 1 in the front of the vehicle body, a dashboard 2 is disposed behind bonnet 1 and a handle 3 is disposed on dashboard 2. Footboards 4 are disposed at both sides of the base of dashboard 2. A clutch pedal 5 is disposed at left side footboard 4. A brake pedal, which is not shown, is disposed above right side footboard 4. A seat 6 is disposed above the rear of footboards 4. At one lateral side of seat 6 are disposed a main-speed-changing lever 7, a sub-speed-changing lever 8 and a PTO switching lever 9.

Under seat 6 is disposed a transmission of the present invention. The transmission comprises a running speed changing unit and a PTO transmission unit which are housed in a transmission casing comprising a front casing 10 and a rear casing 11 separably joined on a vertical plane. An input shaft 12, a front wheel driving shaft 13 and a mid-PTO shaft 14 project frontwardly from the front surface of front casing 10. Input shaft 12 is interlocked with a crank shaft of engine E through a main clutch 39 and a transmission shaft 16 in a clutch housing 15. The driving power of front wheel driving shaft 13 is transmitted to an input shaft 19 projecting from a front axle casing 18 through a universal joint 17 so as to drive front wheels 20 journalled to both sides of front axle casing 18. Reference numeral 22 designates a cylinder for power steering. Mid-PTO shaft 14 interlocks with an input shaft 26 projecting from a gearbox 25 of a mower 24 through a universal joint 23. Mower 24 is suspended to rise and fall by a lift (not shown) with respect to the ground surface, in a belly space between front wheels 20 and rear wheels 21.

Axles 27 project laterally from both sides of the rear of rear casing 11 and pivotally support rear wheels 21, respectively. On the upper surface of rear casing 11 is mounted a cylinder casing 29 of a hydraulic lift provided with a pair of lift arms 30 projecting rearwardly therefrom. Lower links 31 and a draw bar hitch 32 are mounted onto the lower portion of the rear end of rear casing 11. A working machine is mountable to lift arms 30, lower links 31 and a top link (not shown) and can be freely raised or lowered with respect thereto. A traction working machine is mountable to draw bar hitch 32. From the rear end surface of rear casing 11 projects a rear-PTO shaft 36 for driving a working machine such as a rotary cultivator mounted onto the rear of the working vehicle.

Figure 2:
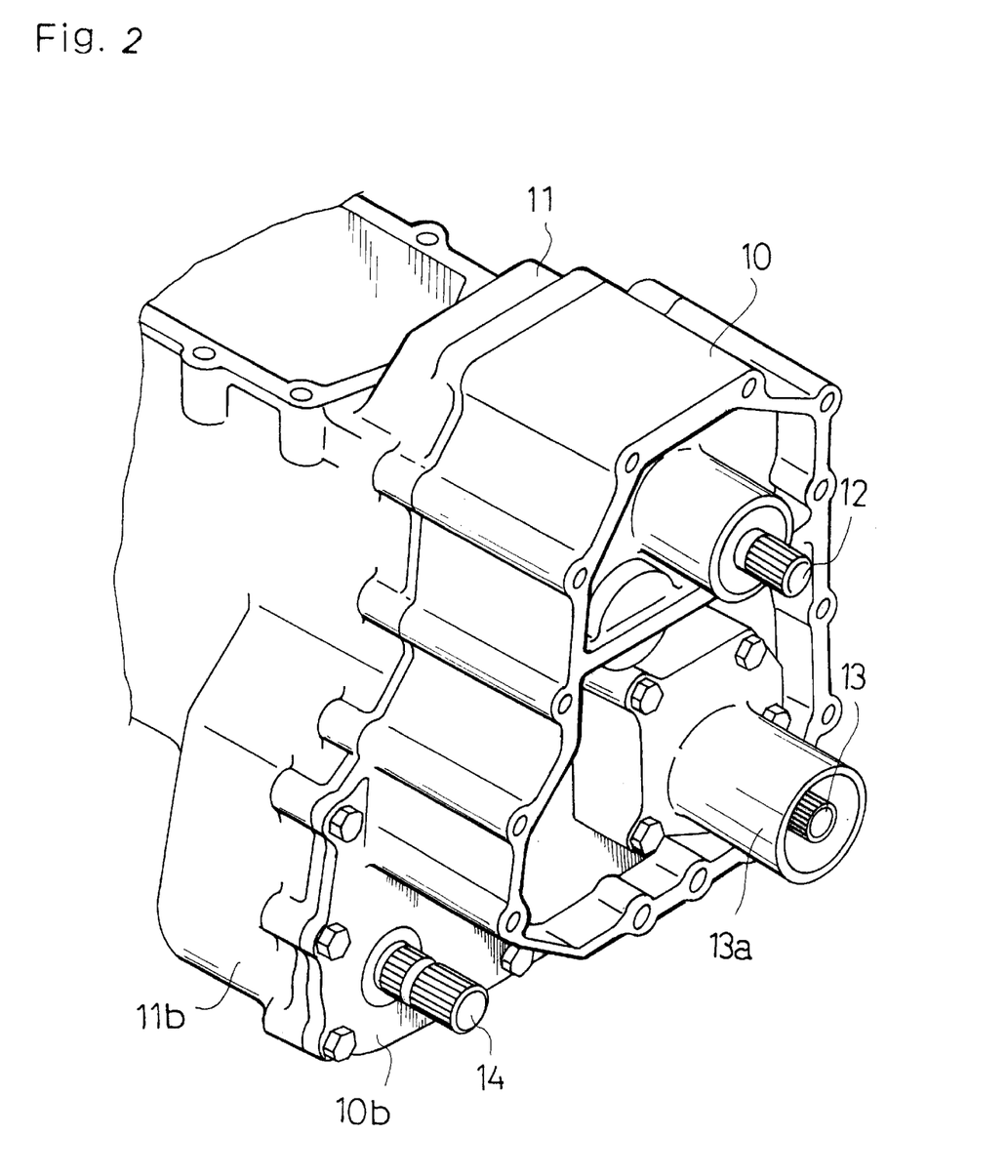
FIG. 2 is a perspective view of a front portion of a transmission casing.
Figure 3:
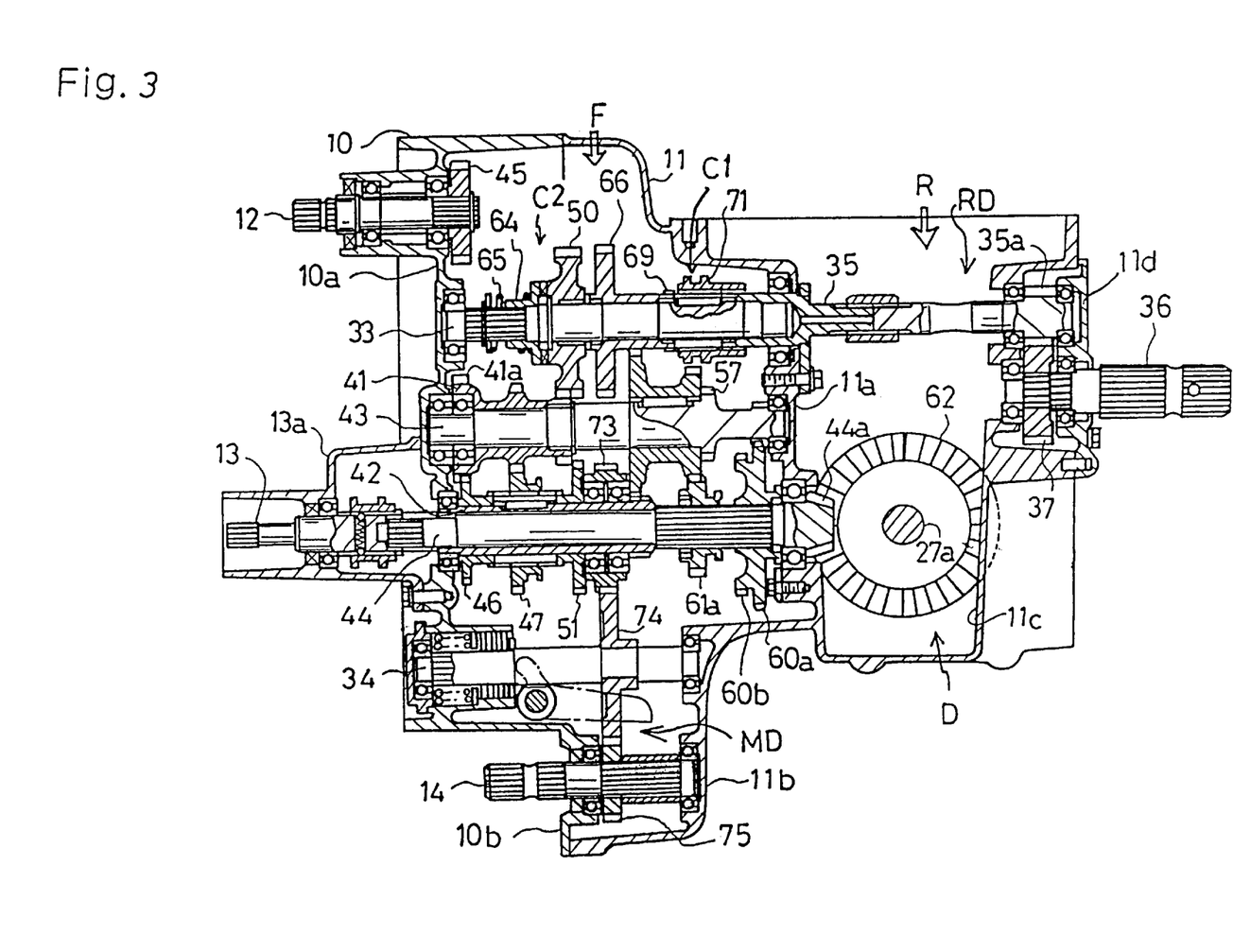
FIG. 3 is a development taken on line 3—3 in FIG. 5.
Figure 5:
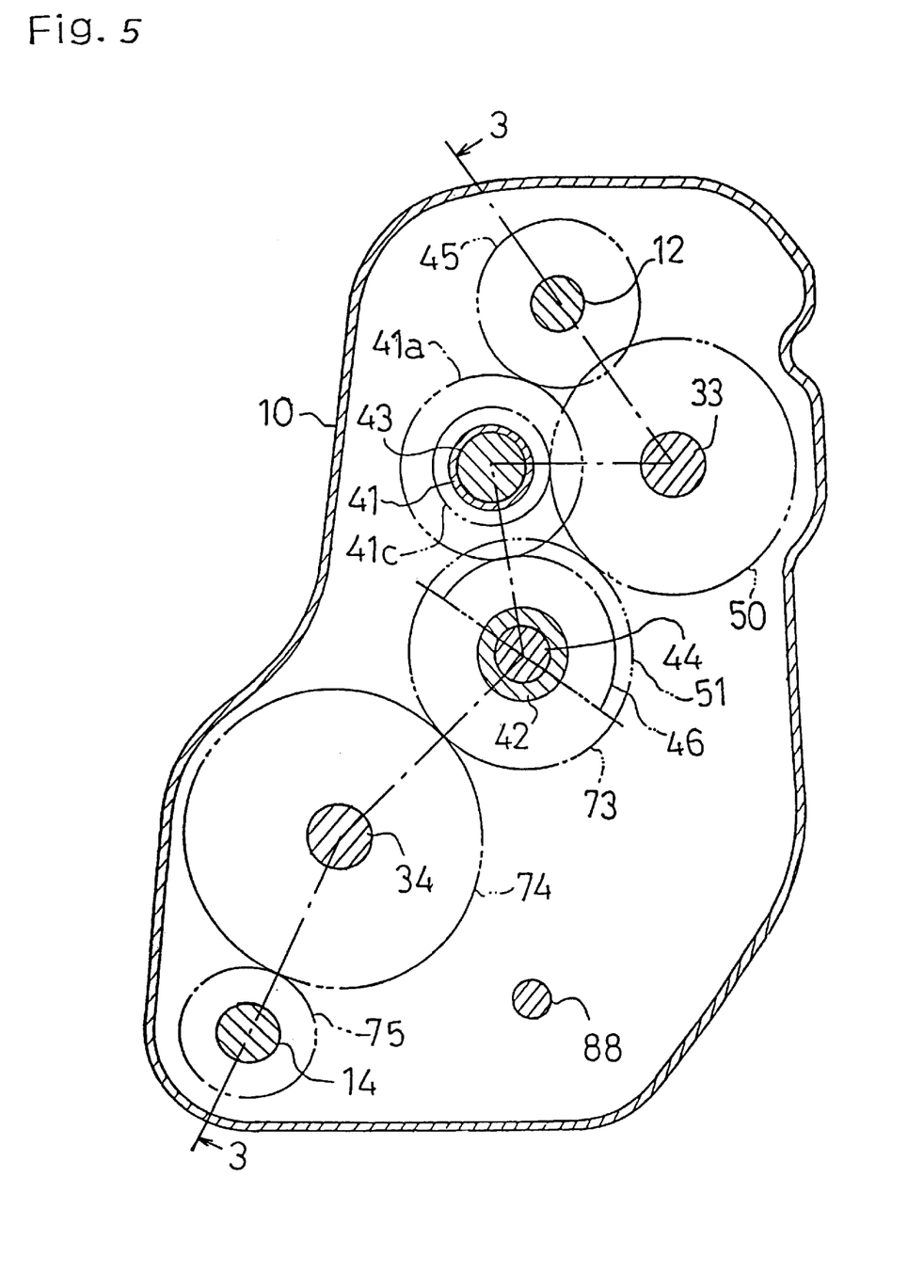
FIG. 5 is a cross-sectional front view of the transmission.

As shown in FIGS. 2 and 3, the transmission casing comprises front casing 10 forming a front wall 10a and opening the rear end thereof and rear casing 11 involving a partition wall 11a therein and opening at the front end thereof. The opening ends of front and rear casings 10 and 11 are jointed to each other. One end of input shaft 12 is journalled to the upper portion of front wall 10a of front casing 10. Between front wall 10a and partition wall 11a within rear casing 11 are longitudinally disposed a PTO transmission shaft 33, a third running shaft 43, a fourth running shaft 44, a counter shaft 34 and a mid-PTO shaft 14, in parallel with one another, with their axial ends journalled. From a front view, shown in FIG. 5, input shaft 12 is positioned at about a lateral belly position in the upper portion of the transmission casing. PTO transmission shaft 33 and third running shaft 43 are disposed at about the same level in the lateral direction below input shaft 12. Fourth running shaft 44 is disposed below third running shaft 43. Counter shaft 34 and mid-PTO shaft 14 are disposed, in order, in a slanting downward direction from fourth running shaft 44.

The joint surfaces of front casing 10 and rear casing 11 are positioned on an imaginary plane perpendicular to mid-PTO shaft 14. Hence, mid-PTO shaft 14, a mid-PTO drive train MD, as discussed below, and various power transmission parts can be easily inserted into the transmission casing so as to ease assembly of the transmission.

Front casing 10 integrally or in one piece forms an expanded portion 10b which journals the front end of mid-PTO shaft 14 to the front wall thereof and the rear end of which is open. Rear casing 11 integrally or in one piece forms an expanded portion 11b which journals the rear end of mid-PTO shaft 14 to the rear wall thereof; the front end being open. When front casing 10 and rear casing 11 are joined, both of the open ends of expanded portions 10b and 11b are joined to each other so that the interior thereof forms a closed space, at a substantially longitudinal center of the transmission casing, wherein the longitudinal length of the joined expanded portions is smaller than that of the transmission casing. The mid-PTO shaft 14 is rotatably supported within the closed space formed by the joined expanded portions 10b and 11b. Accordingly, a conventional output casing for supporting a mid-PTO shaft exclusively is no longer necessary, thereby reducing the number of parts and the cost for production. Additionally, it is unnecessary to form by machine the joint surfaces of the output casing and the transmission casing and to seal between them.

Expanded portions 10b and 11b extend slantingly downward from the bottom of the transmission casing, thereby enabling mid-PTO shaft 14 to be laterally, eccentrically disposed as mentioned above. Accordingly, the transmission casing can be restricted to a compact vertical size with respect to mid-PTO shaft 14 and can be positioned higher with respect to the ground surface. Additionally, a housing for draw bar hitch 32 is disposed laterally to expanded portions 10b and 11b, thereby enabling the lowest point of the working vehicle with respect to the ground surface to be higher.

Partition wall 11a within rear casing 11 longitudinally divides the interior of the transmission casing. In a front chamber F formed in front casing 10 in front of partition wall 11a are disposed the running speed changing unit, a mid-PTO drive train MD of the PTO transmission unit (to be discussed below) and a PTO clutch mechanism. In a rear chamber R formed between partition wall 11a and rear wall 11c of rear casing 11 are a rear-PTO drive train RD and a differential gear unit D. Rear-PTO drive train RD comprises: a rear-PTO input shaft 35, which is longitudinally disposed between the upper portions of partition wall 11a and rear wall 11c and is journalled in a recess formed on a rear surface of rear wall 11c, and a rear-PTO shaft 36, which is supported between rear wall 11c and a cover 11d, wherein a gear 35a mounted onto rear portion of rear-PTO input shaft 35 always engages with a gear 37 fixed onto rear-PTO shaft 36.

A driving power is transmitted from engine E to the front end of output shaft 12 through main clutch 39 and transmission shaft 16, as mentioned above. An input gear 45 is fixed onto the rear end of input shaft 12 in front chamber F and always engages with a gear 41a on a cylindrical first running shaft 41 pivoted around third running shaft 43.

Figure 4:
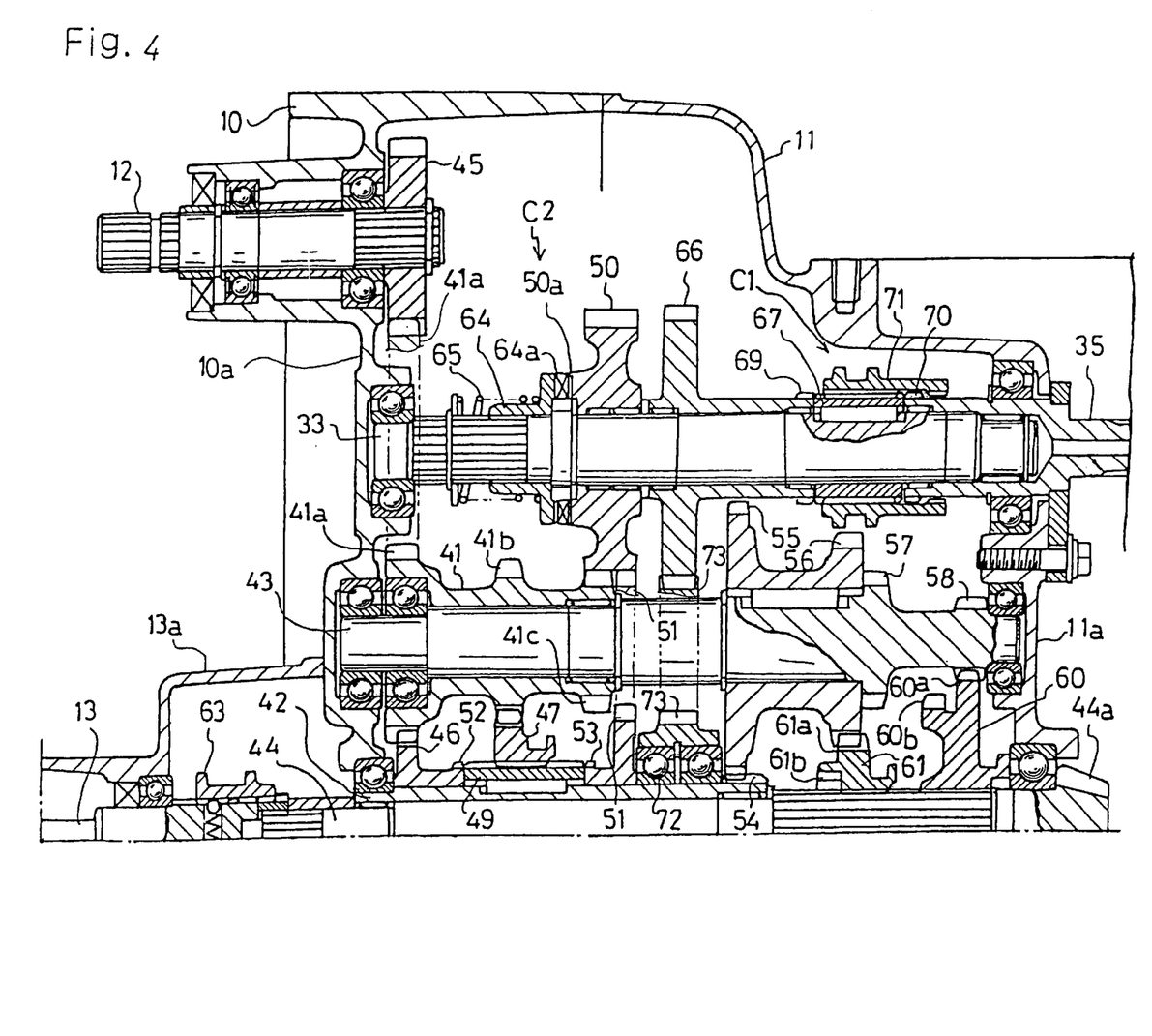
FIG. 4 is an enlarged development view of an upper portion of FIG. 3.

As shown in FIG. 4, three successive gears 41a, 41b and 41c are integrally formed around first running shaft 41. Gear 41a always engages with a high speed gear 46 pivoted around a cylindrical second running shaft 42 which is parallel to first running shaft 41. Gear 41b can engage with a low speed gear 47 which is axially, slidably spline-fitted onto a hub 49 which in turn is rotatable together with second running shaft 42. Gear 41c always engages with a PTO transmission gear 50 pivoted around PTO transmission shaft 33. The wide-shaped PTO transmission gear 50 always engages with a rearward running gear 51 pivoted around second running shaft 42.

A first speed change section of the running speed changing unit is constructed as described in the preceding paragraph. The above mentioned main-speed-changing lever 7 is shifted straightly along an I-shaped shifting pattern to "a high speed position", "a low speed position" and "a rearward running position". Low speed gear 47 is interlocked to main-speed-changing lever 7 so as to slide on hub 49 in connection with such a shifting of main-speed-changing lever 7.

When main-speed-changing lever 7 is shifted to "the high speed position", an inner gear of low speed gear 47 engages with an engaging member 52 of high speed gear 46 so that the driving power of input gear 45 is transmitted to second running shaft 42 through gear 41a, high speed gear 46, low speed gear 47 and hub 49 in order. The driving power of input gear 45 is also transmitted to PTO transmission gear 50 through high speed gear 46, gear 41a, first running shaft 41 and gear 41c. Then, rearward gear 51 engaging with PTO transmission gear 50 runs idle around second running shaft 42.

When main-speed-changing lever 7 is shifted to "the low speed position", low speed gear 47 engages with gear 41b so that the driving power of input gear 45 is transmitted to second running shaft 42 through gear 41a, gear 41b, low speed gear 47 and hub 49 in order. The driving power of input gear 45 is also transmitted to PTO transmission gear 50 through low speed gear 47, gear 41b, first running shaft 41 and gear 41c. Then, rearward gear 51 engaging with PTO transmission gear 50 runs idle around second running shaft 42.

When main-speed-changing lever 7 is shifted to "the rearward running position", the inner gear of low speed gear 47 engages with an engaging member 53 of rearward running gear 51 so that the driving power of input gear 45 is transmitted to second running shaft 42 through gear 41a, gear 41c, PTO transmission gear 50, rearward running gear 51, low speed gear 47 and hub 49 in order. PTO transmission gear 50 is also used for an idle gear in a rearward running gear train.

Each of the cylindrical first and second running shafts 41 and 42, which is axially shorter than each of the third and fourth running shafts 43 and 44 respectively, is disposed near the front end of each of the third and fourth running shafts 43 and 44 respectively. A second running speed change section, constructed as described below, is disposed between the rear portions of third and fourth running shafts 43 and 44. Gears 55, 56, 57 and 58 which have different diameters from one another are fixed onto the rear portion of third running shaft 43. The rear portion of fourth running shaft 44 is roundly splined so as to engage with a pair of sliding gears 60 and 61 axially slidable. Sliding gear 60 is provided thereon with an outer gear 60a engageable with gear 58 and an outer gear 60b engageable with gear 57. Sliding gear 61 is provided thereon with an outer gear 61a engageable with gear 56 and provided therein with an inner gear 61b engageable with a gear 54 formed on rear end of second running shaft 42. Gear 54 always engages with gear 55.

The above mentioned sub-speed-changing lever 8 can be shifted along an H-shaped shifting pattern to "a first speed position", "a second speed position", "a third speed position" and "a fourth speed position". Sliding gears 60 and 61 are interlocked to sub-speed-changing lever 8 so that one of them selectively can slide in connection with such a shifting of sub-speed-changing lever 8.

When sub-speed-changing lever 8 is shifted to "the first speed position", outer gear 60a of sliding gear 60 engages with gear 58 so as to greatly decelerate fourth running shaft 44 during transmission thereto from second running shaft 42 through gear 54, gear 55, gear 58 and outer gear 60a in order. When sub-speed-changing lever 8 is shifted to "the second speed position", outer gear 60b of sliding gear 60 engages with gear 57 so as to decelerate fourth running shaft 44 during transmission thereto from second running shaft 42 through gear 54, gear 55, gear 57 and outer gear 60b in order. When sub-speed-changing lever 8 is shifted to "the third speed position", sliding gear 60 slides out of gears 58 and 57 and outer gear 61a of sliding gear 61 engages with gear 56 so as to slightly decelerate fourth running shaft 44 during transmission thereto from second running shaft 42 through gear 54, gear 55, gear 56 and outer gear 61a in order. When sub-speed-changing lever 8 is shifted to "the fourth speed position", inner gear 61b of sliding gear 61 engages with gear 54 so as to directly transmit the rotational power from second running shaft 42 to fourth running shaft 44 through gear 54 and inner gear 61b.

As constructed, the first speed change section, which offers high speed running, low speed running and rearward running, and the second speed change section, which offers four running speeds, are connected to each other in series and constitute the running speed changing unit. Thus, the running speed changing unit offers twelve running speeds comprising eight speeds in forward travel and four speeds in rearward travel.

Figure 6:
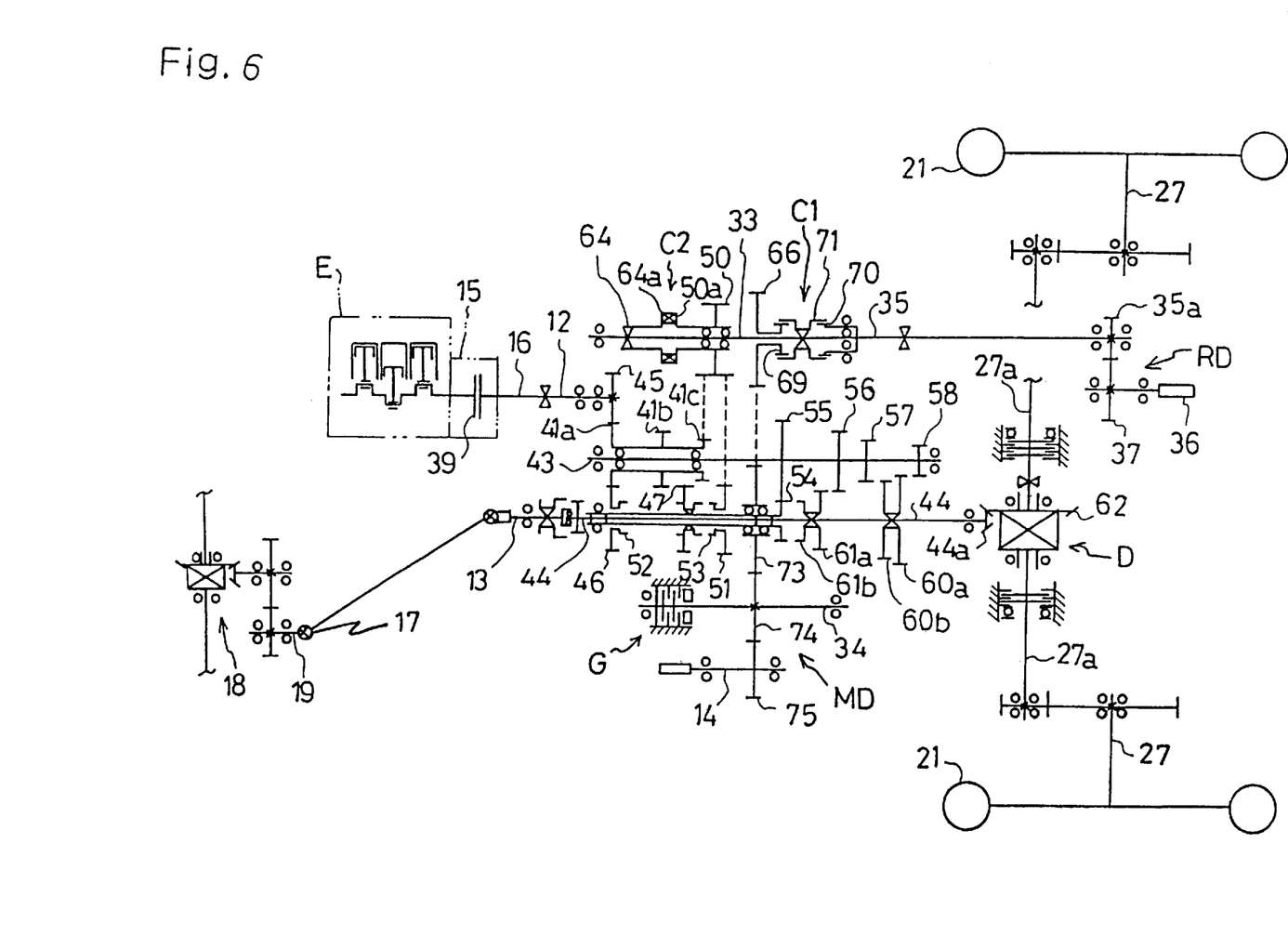
FIG. 6 is a diagram of the transmission.

A pinion 44a formed on the rear end of fourth running shaft 44 engages with a ring gear 62 of a differential gear unit D. As shown in FIG. 6, in differential gear unit D, left and right differential yoke shafts 27a are differentially connected with each other respectively to drive left and right axles 27 through reduction gears. The rear end of front wheel driving shaft 13, which has the same rotational center axis of fourth running shaft 44, is pivoted around the front end of fourth running shaft 44 and is projected outwardly from front wall 10a of front casing 10. Front wheel driving shaft 13 is supported rotatably and housed in a support casing 13a attached to front wall 10a of front casing 10.

A clutch slider 63 is axially, slidably spline-fitted onto front wheel driving shaft 13. When clutch slider 63 engages with the splined portion of the front end of fourth running shaft 44, front wheels 20 and rear wheels 21 are simultaneously driven so that the working vehicle is driven by four wheel drive. When clutch slider 63 disengages from fourth running shaft 44, only rear wheels 21 are driven so that the working vehicle is driven by two wheel drive. Clutch slider 63 is shifted by a four wheel drive selecting lever which is not shown in the working vehicle drawings provided.

Next, the PTO transmission unit will be explained. PTO transmission gear 50, pivoted around PTO transmission shaft 33, forms clutch teeth 50a on one side thereof. A clutch body 64 is spline-fitted onto PTO transmission shaft 33 and forms clutch teeth 64a on one side thereof. Clutch body 64 is biased toward PTO transmission gear 50 through a spring 65 so that clutch teeth 64a thereof engage with clutch teeth 50a. Clutch teeth 50a and 64a engage together in one rotational direction and disengage in the opposite rotational direction so as to constitute a one-way clutch C2, which connects PTO transmission gear 50 with PTO transmission shaft 33. Thereby, even if inertial idling is generated by the working machine connected to rear-PTO shaft 36, one-way clutch C2 idles so as to prevent input shaft 12 from backlashing, which causes engine trouble.

Mid-PTO drive train MD for transmitting driving power to mid-PTO shaft 14 is constructed so that a mid-PTO input gear 66 is pivoted around the midpoint of PTO transmission shaft 33. A hub 67 is fixed onto PTO transmission shaft 33 behind mid-PTO input gear 66. The front end of rear-PTO input shaft 35 is pivoted around the rear end of PTO transmission shaft 33 with the axis of the former in coincidence with that of the latter. Mid-PTO input gear 66 always engages with a first counter gear 73, which is pivoted around the rear portion of second running shaft 42 through a bearing 72 and is disposed between gears 51 and 54. First counter gear 73 always engages with a second counter gear 74, fixed onto counter shaft 34, and second counter gear 74 always engages with a gear 75, fixed onto mid-PTO shaft 14.

Mid-PTO drive train MD, which transmits driving power to mid-PTO shaft 14 and comprises mid-PTO input gear 66, first counter gear 73, second counter gear 74 and gear 75, is disposed in the transmission casing front chamber F. Mid-PTO drive train MD is further disposed between the first speed change section (constituting a main-speed-changing unit) and the second speed change section (constituting a sub-speed-changing unit) so as to be constructed simply in the vertical direction within the transmission casing. Additionally, the efficient disposal of mid-PTO drive train MD, between the first and second speed change sections, enables mid-PTO drive train MD together with the first and second speed change sections to be housed compactly within the transmission casing and enables mid-PTO shaft 14 to be disposed below the transmission casing at an optimum position.

Also, PTO transmission gear 50, provided in the running speed changing unit gear train, functions as an idle gear regularly driven during rearward travel. In addition, PTO transmission gear 50 is used as an input gear for PTO transmission shaft 33 when driving power is transmitted from input shaft 12 to PTO transmission shaft 33 through PTO transmission gear 50. Hence, an exclusive shaft for mounting an idle gear is unnecessary which results in the entire transmission being constructed compactly with a corresponding reduction in manufacturing cost.

Also, gear 73, the first counter gear in mid-PTO drive train MD, pivots around running shaft 42 when transmitting driving power from the first speed change section to the second speed change section. Therefore, a shaft for mounting gear 73 is unnecessary which results in mid-PTO drive train MD also being constructed compactly.

Around PTO transmission shaft 33 is a PTO clutch mechanism C1 which is constructed as follows. An engaging member 69 is formed on one side of mid-PTO input gear 66 and an engaging member 70 is formed on one side of rear-PTO input shaft 35. A clutch slider 71 is axially, slidably spline-fitted onto the splined round surface of hub 67. PTO switching lever 9 is shifted straightly along an I-shaped shift pattern to four positions: "a rear-PTO shaft driving position (R)", "a neutral position (N)", "a both PTO shafts driving position (B)" and "a mid-PTO shaft driving position (M)". PTO switching lever 9 is interlocked to clutch slider 71. When PTO switching lever 9 is shifted, clutch slider 71 slides on hub 67.

When PTO switching lever 9 is shifted to "rear-PTO shaft driving position (R)", clutch slider 71 slides from the position described in FIG. 4 to the right of FIG. 4 so as to engage with only engaging member 70 of rear-PTO input shaft 35. Thereby, the driving power is transmitted from PTO transmission shaft 33 to rear-PTO input shaft 35 through hub 67 and clutch slider 71 so that only rear-PTO shaft 36 is driven through gears 35a and 37.

When PTO switching lever 9 is shifted to "neutral position (N)", clutch slider 71 is positioned at the position described in FIG. 4 so as to disengage from both of the engaging member 70 of the rear PTO input shaft 35 and engaging member 69 of mid-PTO input gear 66, thereby neither rear-PTO shaft 36 nor mid-PTO shaft 14 is driven.

When PTO switching lever 9 is shifted to "both PTO shafts driving position (B)", clutch slider 71 slides from the position described in FIG. 4 to the left of FIG. 4 so as to engage with both engaging member 70 of rear-PTO input shaft 35 and engaging member 69 of mid-PTO input gear 66. Thereby, the driving power from PTO transmission shaft 33 is transmitted simultaneously, through hub 67 and clutch slider 71, to both mid-PTO input gear 66 and rear-PTO input shaft 35 so that mid-PTO shaft 14 and rear-PTO shaft 36 are both driven.

When PTO switching lever 9 is shifted to "mid-PTO shaft driving position (M)", clutch slider 71 slides further to the left of FIG. 4 so as to engage with engaging member 69 of mid-PTO input gear 66. Thereby, the driving power from the PTO transmission shaft 33 is transmitted, through hub 67 and clutch slider 71, to mid-PTO input gear 66 so that only mid-PTO shaft 14 is driven.

Thus, PTO clutch mechanism C1 is able to be positioned so that: only mid-PTO shaft 14 is driven, only rear-PTO shaft 36 is driven, both mid-PTO shaft 14 and rear-PTO shaft 36 are driven, and neither mid-PTO shaft 14 nor rear-PTO shaft 36 is driven. Since PTO clutch mechanism C1 is constructed along one shaft, only clutch switching lever 9 is operated when selecting each of the positions, thereby enabling an operator to easily operate the vehicle.

As shown in FIG. 6, located on counter shaft 34 is a brake unit G for prevention of inertial idling. Brake unit G can stop mid-PTO shaft 14 when the PTO switching lever 9 is shifted to "neutral position (N)" or "rear-PTO shaft driving position (R)", thereby preventing a working machine attached at the belly portion of the working vehicle from wasted inertial idling thereof. To restrain brake unit G from acting when PTO switching lever 9 is shifted to "both PTO shafts driving position (B)" or "mid-PTO shaft driving position (M)", brake unit G is provided with a restraint mechanism.

Figure 7:
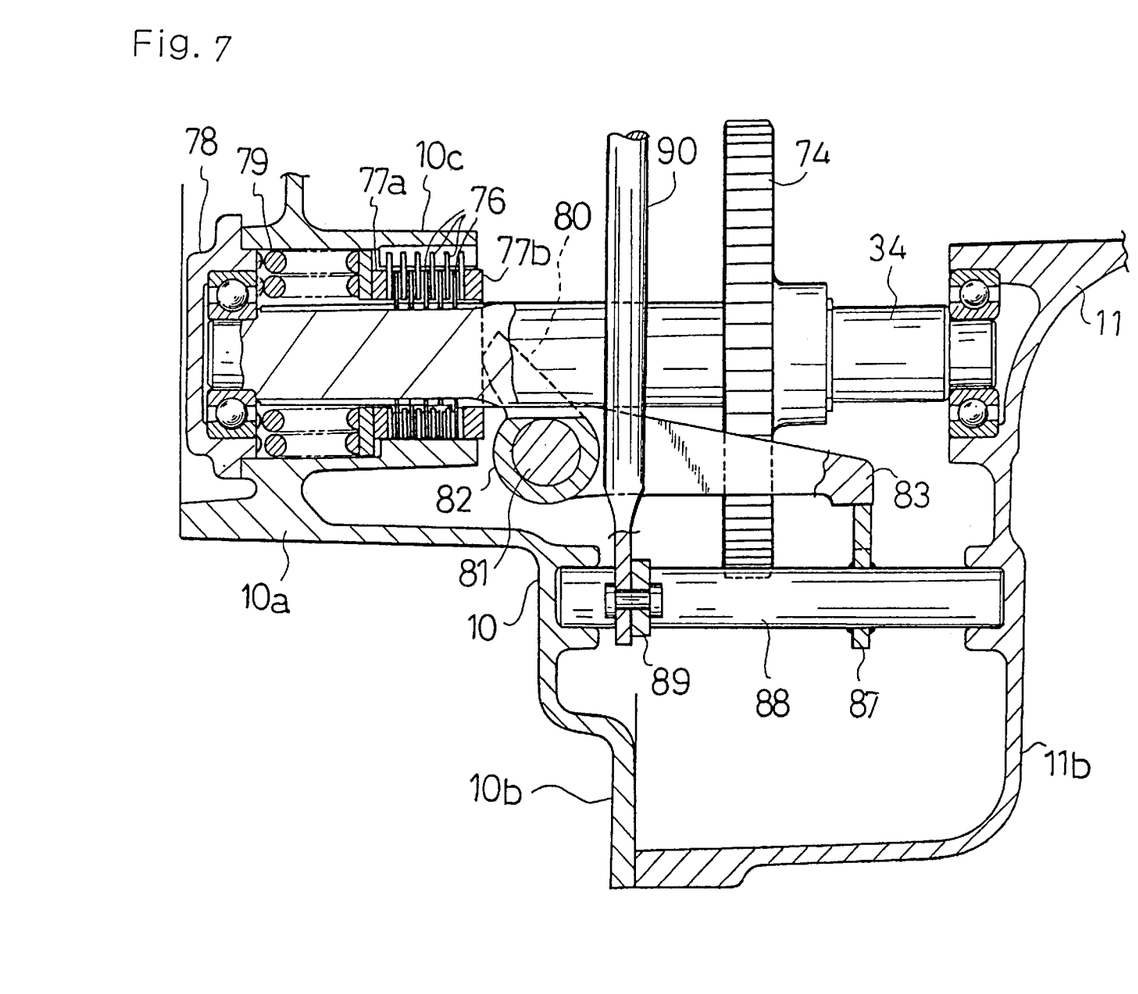
FIG. 7 is a partial cross-sectional side view of the transmission showing a brake unit for prevention of inertial idling and a restraint unit.

Brake unit G for prevention of inertial idling is constructed as follows. As shown in FIG. 7, both ends of counter shaft 34 are journalled against bearings between a lid 78, disposed on front wall 10a of front casing 10, and the lower portion of rear casing 11. A cylindrical brake chamber 10c, covering the front round portion of counter shaft 34, is formed at front wall 10a of front casing 10. A plurality of friction plates 76 are disposed so that one plate engages with the inner side of brake chamber 10c and another plate engages with the outer round portion of counter shaft 34. A pair of pressure plates 77a and 77b are disposed at both front and rear sides of the group of friction plates 76. A spring 79 is interposed between pressure plate 77a and lid 78. Pressure plate 77b abuts against the uppermost end of a pressure arm 80, to be discussed below. When pressure arm 80 is positioned at the position disclosed in FIG. 7, pressure plate 77a is biased by spring 79 and pressed against pressure plate 77b sandwiching friction plates 76 so as to stop counter shaft 34. When pressure arm 80 is rotated clockwise from the disclosed position, pressure plate 77a moves further apart from pressure plate 77b so as to separate friction plates 76.

Figure 8:
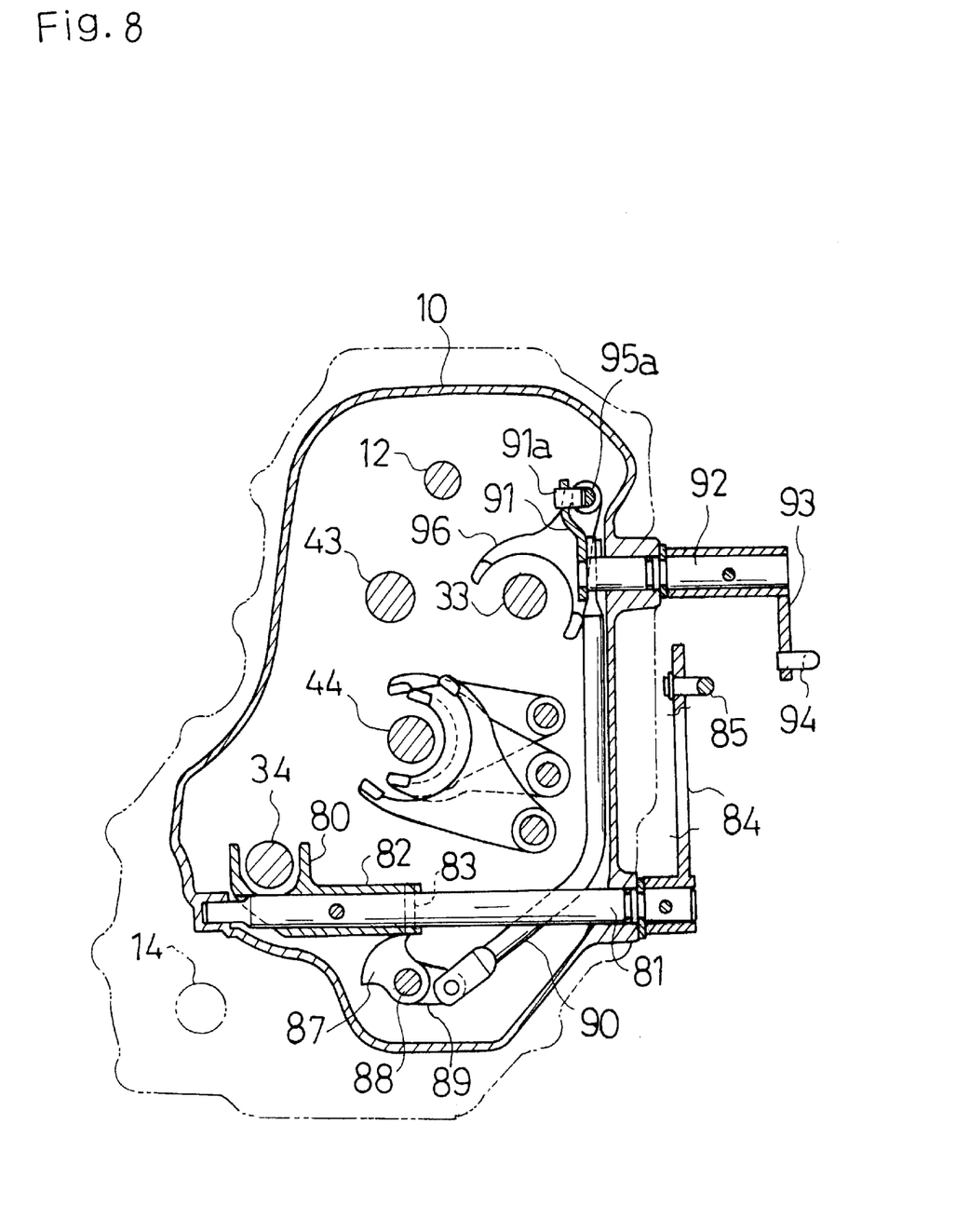
FIG. 8 is a cross-sectional front view of the restraint unit.
Figure 9:
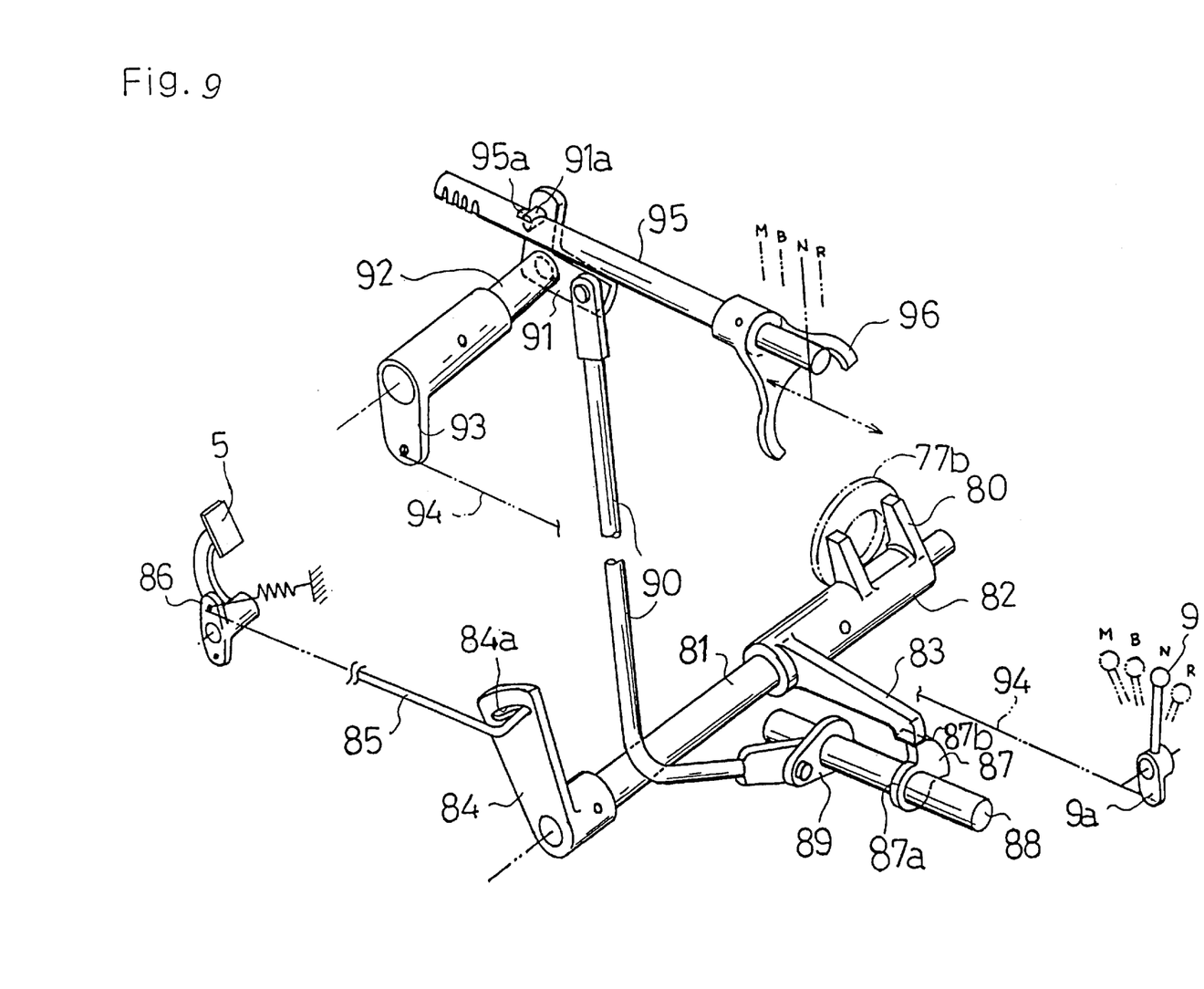
FIG. 9 is a perspective view of the restraint unit.

The restraint mechanism of brake unit G for prevention of inertial idling is constructed as shown in FIGS. 7, 8 and 9. A supporting shaft 81 is supported rotatably at both ends by the sides of the inner wall of front casing 10 and is located below counter shaft 34 substantially perpendicular thereto. Thus, supporting shaft 81 is disposed laterally in the transmission casing. One end of supporting shaft 81 extends out of the transmission casing so as to fix an arm 84 thereto. Arm 84 is connected with one end of a rod 85 through a long arcuate hole 84a thereof, shown in FIG. 9. The front end of rod 85 is connected with an arm 86 disposed at the rotational base of clutch pedal 5. A cylindrical shaft 82 is fixed onto supporting shaft 81. Pressure arm 80 extends upwardly therefrom. Abutting arm 83 extends rearwardly therefrom.

A restraint shaft 88 is rotatably supported at one end by expanded portion 10b of front casing 10 and at the other end by expanded portion 11b of rear casing 11, and is located below supporting shaft 81 substantially perpendicular thereto. Thus, restraint shaft 88 is disposed longitudinally in the transmission casing. A fan-shaped restraint cam 87, which forms a small diametric portion 87a and a large diametric portion 87b, is fixed onto the rear portion of restraint shaft 88 so that it may abut against the uppermost end of abutting arm 83. An arm 89 is fixed onto the front portion of restraint shaft 88. One end of a connecting rod 90 is pivoted onto arm 89. As shown in FIG. 8, connecting rod 90 extends upwardly along the left side wall of front casing 10 and the other end thereof is pivoted onto one end of a crank arm 91. Crank arm 91 is fixed onto the inner end portion of an operating shaft 92 which is supported rotatably by the left side wall of front casing 10. An arm 93 is fixed onto the outer end of operating shaft 92 which projects out of front casing 10. Arm 93 is connected with an arm 9a of PTO switching lever 9 through a rod 94. A pin 91a projecting from the other end of crank arm 91 is inserted into an engaging hole 95a formed on a PTO switching shaft 95 which is longitudinally slidably supported between front casing 10 and rear casing 11. A shift fork 96 fixed onto the rear end portion of PTO switching shaft 95 engages with clutch slider 71.

As shown in FIG. 9, when PTO switching lever 9 is turned longitudinally, crank arm 91 is rotated around operating shaft 92 so as to rotate restraint shaft 88 by connecting rod 90, thereby changing the position of restraint cam 87 with respect to abutting arm 83. Simultaneously, PTO switching shaft 95, connected with pin 91a and projected from the other end of crank arm 91, is slided longitudinally so that shift fork 96 shifts clutch slider 71, which is not shown in FIG. 9, to one of the four positions mentioned above.

Figure 10:
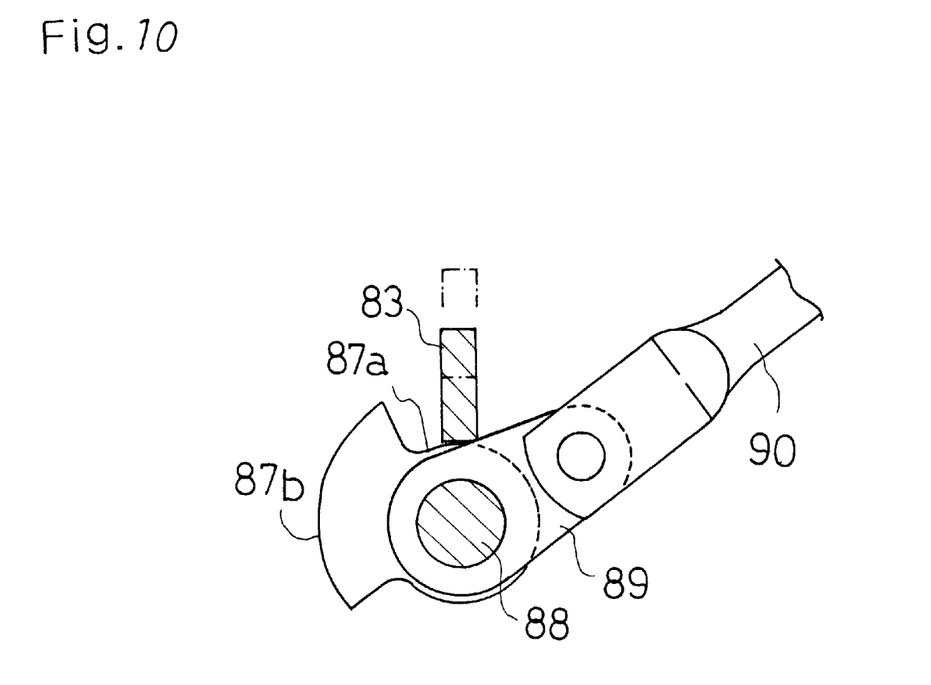
FIG. 10 is a partial cross-sectional front view of the restraint unit when a PTO switching lever 9 is positioned at "a mid-PTO shaft driving position"
Figure 11:
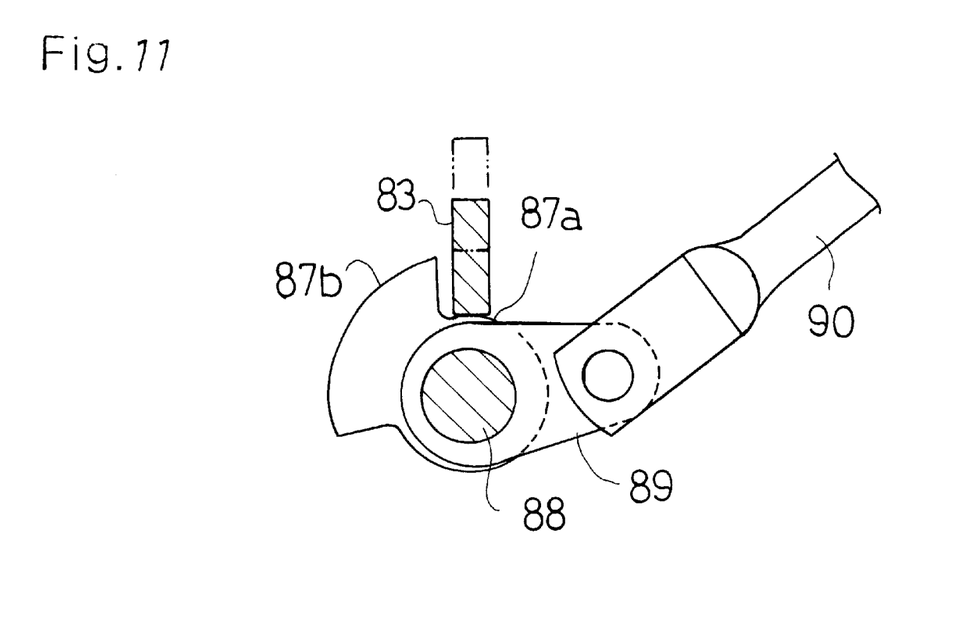
FIG. 11 is a partial cross-sectional front view of the restraint unit when a PTO switching lever 9 is positioned at "a both PTO shafts driving position"
Figure 12:
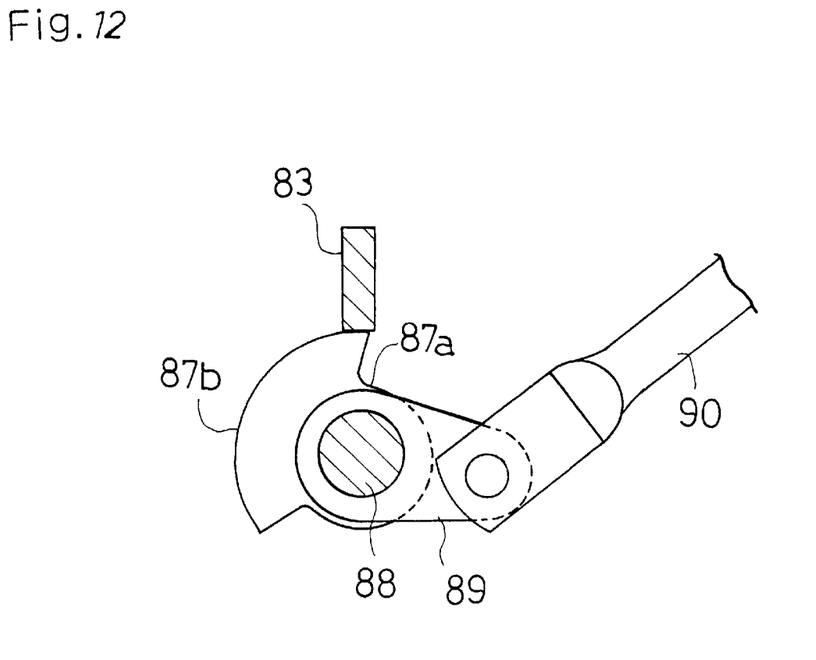
FIG. 12 is a partial cross-sectional front view of the restraint unit when a PTO switching lever 9 is positioned at "a neutral position"
Figure 13:
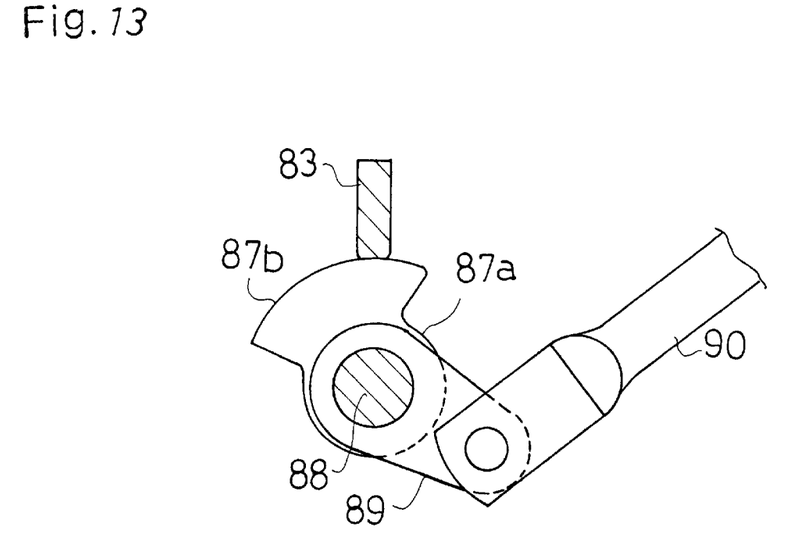
FIG. 13 is a partial cross-sectional front view of the restraint unit when a PTO switching lever 9 is positioned at "a rear-PTO shaft driving position".

The shape of restraint cam 87 and the rotational degree of restraint shaft 88 is set so that abutting arm 83 is positioned on or above small diametric portion 87a of restraint cam 87 when PTO switch lever 9 is positioned at "mid-PTO shaft driving position (M)" or "both PTO shafts driving position (B)" as shown in FIGS. 10 and 11. Abutting arm 83 is positioned on large diametric portion 87b of restraint cam 87 when PTO switch lever 9 is positioned at "neutral position (N)" or "rear-PTO shaft driving position (R)" as shown in FIGS. 12 and 13. Additionally, the rotational degree of supporting shaft 81 and the lengths of abutting arm 83 and pressure arm 80 are so set that when abutting arm 83 abuts against small diametric portion 87a of restraint cam 87, pressure arm 80 is apart from pressure plate 77b and when abutting arm 83 abuts against large diametric portion 87b of restraint cam 87, pressure arm 80 restricts the rearward movement of pressure plate 77b, thereby brake unit G for prevention of inertial idling acts by spring 79.

Before PTO switching lever 9 is shifted to each of the four positions, an operator treads clutch pedal 5 so as to switch off main clutch 39, thereby cutting off power transmission from engine E to input shaft 12. As shown in FIG. 9, when clutch pedal 5 is not trod and PTO switching lever 9 is positioned at "neutral position (N)" or "rear-PTO shaft driving position (R)" so that brake unit G for prevention of inertial idling acts as described above, the end of rod 85 not interlocked to clutch pedal 5 is positioned at the right end of long hole 84a as shown in FIG. 9. Then, if clutch pedal 5 is trod so as to shift PTO switching lever 9 to another position, the one end of rod 85 merely moves freely toward the other end (which designates the left end in FIG. 9) of long hole 84a and the tread force of clutch pedal 5 is not transmitted to arm 84. Hence, when PTO switching lever 9 is positioned at "neutral position (N)" or "rear-PTO shaft driving position (R)", brake unit G always acts so as to stop mid-PTO shaft 14 regardless of whether clutch pedal 5 is tread.

The length of long hole 84a is set so that the one end of rod 85 is positioned at the other end therein (the left end of FIG. 9) when clutch pedal 5 is not trod and abutting arm 83 is positioned above small diametric portion 87a of restraint cam 87 so as to turn pressure arm 80 apart from pressure plate 77b. In other words, PTO switching lever 9 is positioned at "mid-PTO shaft driving position (M)" or "both PTO shafts driving position (B)" so as to release brake unit G for prevention of inertial idling. Thereby, when clutch pedal 5 is trod and PTO switching lever 9 is positioned at "mid-PTO shaft driving position (M)" or "both PTO shafts driving position (B)", the tread force thereof is transmitted to pressure arm 80 through arm 84 and supporting shaft 81 so as to press pressure plate 77b. Hence, brake unit G for prevention of inertial idling acts so as to stop mid-PTO shaft 14, which tends to be rotated by an inertia of a working machine.

In such a construction, when PTO switching lever 9 is shifted to "mid-PTO shaft driving position (M)", crank arm 91 is rotated through rod 94 and arm 93 so as to slide PTO switching shaft 95. Shift fork 96 shifts clutch slider 71 to the position for transmitting power only to mid-PTO shaft 14, as mentioned above, and simultaneously, crank arm 91 rotates restraint shaft 88 through connecting rod 90 and arm 89, so as to rotate restraint cam 87, thereby abutting arm 83 is positioned above the periphery of small diametric portion 87a of restraint cam 87 as shown in FIG. 10. Then, if an operator stops treading clutch pedal 5 so as to switch on main clutch 39, then abutting arm 83 is rotated downwardly to abut against small diametric portion 87a which results in pressure arm 80 moving rearwardly apart from pressure plate 77b. Hence, brake unit G for prevention of inertial idling is released so as to enable mid-PTO shaft 14 to be driven. Then, if PTO switching lever 9 is shifted to "both PTO shafts driving position (B)", restraint cam 87 is rotated so as to position abutting arm 83 above small diametric portion 87a thereof, as shown in FIG. 11. Brake unit G for prevention of inertial idling is released as mentioned above so as to enable mid-PTO shaft 14 and rear-PTO shaft 36 to be driven.

Before PTO switching lever 9 is shifted from "mid-PTO shaft driving position (M)" or "both PTO shafts driving position (B)" to "neutral position (N)" or "rear-PTO shaft driving position (R)", clutch pedal 5 is trod. Thus, supporting shaft 81 is rotated in the direction for pressing pressure arm 80 against pressure plate 77*b,* so that brake unit G for prevention of inertial idling automatically acts to stop mid-PTO shaft 14, and abutting arm 80 is lifted upwardly from restraint cam 87.

When PTO switching lever 9 is positioned at "neutral position (N)", restraint cam 87 is positioned as shown in FIG. 12. When PTO switching lever 9 is positioned at "rear-PTO shaft driving position (R)", restraint cam 87 is positioned as shown in FIG. 13. In both cases, since abutting arm 83 abuts against large diametric portion 87*b* of restraint cam 87 so as to keep its lifted condition, pressure arm 80 keeps on pressing against pressure plate 77*b*. Hence, brake unit G keeps on acting so that mid-PTO shaft 14 cannot be rotated. Then, if an operator stops treading on clutch pedal 5, connecting rod 85 slidably returns to the one end of long hole 84*a* of arm 84. Long hole 84*a* allows clutch pedal 5 to be depressed for cutting off the driving of rear-PTO shaft 36 and keeps brake unit G for prevention of inertial idling acting. Rear-PTO shaft 36 can be disposed at the best position in rear-PTO drive train RD so as to be at the best position in the belly portion of the transmission. The transmission casing, which efficiently houses the running speed changing unit and the PTO transmission unit, can be constructed compactly. It can be further constructed compactly because first counter gear 73 is disposed around a shaft for running the transmission.

In such a construction, since the mere operation of PTO switching lever 9 is enough for brake unit G to automatically stop mid-PTO shaft 14 when it is not driven, complicated operation is not required. Also, since brake unit G for prevention of inertial idling is constructed so as to keep on acting without reference to switching of main clutch 39, mid-PTO shaft 14 can be stopped from the point of time at which main clutch 39 is switched off until PTO clutch mechanism C1 is turned from the condition wherein only mid-PTO shaft 14 is driven to the condition wherein only rear-PTO shaft 36 is driven or to the neutral condition. Thereafter, brake unit G keeps on acting so as to keep mid-PTO shaft 14, which is not used, stopped, even if main clutch 39 is switched on.

Also, since brake unit G for prevention of inertial idling and the link mechanism connecting brake unit G for prevention of inertial idling with PTO clutch mechanism C1, are housed in the transmission casing, link members 80, 81, 82, 83, 87, 88, 89, 90 and 91 are not exposed to dust, water or mud and thus are prevented from defective movement. Hence, brake unit G for prevention of inertial idling may operate stably and surely for a long time.

What is claimed is:

1. A transmission for a working vehicle comprising:
   a transmission casing;
   an input shaft disposed in said casing to which power is transmitted from an engine;
   a pair of axles disposed in said casing to which left and right running wheels of the working vehicle are attached;
   a running speed changing unit interlocking said input shaft and said axles;
   a mid-PTO shaft for driving a working machine attached to a belly portion of said working vehicle;
   a mid-PTO drive train interlocking said input shaft and said mid-PTO shaft; and
   an expanded portion formed in one piece with a lower portion of a substantially longitudinal center of said transmission casing, which supports said mid-PTO shaft, wherein the longitudinal length of said expanded portion is smaller than that of said transmission casing.

2. A transmission for a working vehicle as set forth in claim 1, wherein said expanded portion extends slantingly downward from a lower portion of said transmission casing so as to laterally and eccentrically dispose said mid-PTO shaft therein.

3. A transmission for a working vehicle as set forth in claim 1, wherein said transmission casing comprises a front casing and a rear casing separably joined along a plane perpendicular to said mid-PTO shaft.

4. A transmission for a working vehicle comprising:
   a transmission casing;
   an input shaft disposed in said casing to which power is transmitted from an engine;
   a pair of axles disposed in said casing to which left and right running wheels of the working vehicle are attached;
   a running speed changing unit disposed in said casing, interlocking said input shaft and said axles;
   a PTO transmission shaft disposed in said casing driven by said input shaft;
   a mid-PTO shaft for driving a working machine attached to a belly portion of said working vehicle; and
   a mid-PTO drive train disposed in said casing, interlocking said PTO transmission shaft and said mid-PTO shaft;
   wherein said running speed changing unit comprises a first speed change section and a second speed change section which are disposed longitudinally with respect to a vehicle body and are connected in series, and said mid-PTO drive train is disposed between said first speed change section and said second speed change section.

5. A transmission for a working vehicle as set forth in claim 4, further comprising:
   an idle gear, which is provided in a drive train of said running speed changing unit so as to be regularly driven during rearward travel and is disposed around said PTO transmission shaft, wherein power from said input shaft is transmitted to said PTO transmission shaft through said idle gear.

6. A transmission for a working vehicle as set forth in claim 4, wherein said mid-PTO drive train comprises:
   a rotative transmission member pivoted around a running shaft for transmitting power from said first speed change section to said second speed change section.

7. A transmission for a working vehicle as set forth in claim 4, further comprising:
   a rear-PTO shaft for driving a second working machine attached to a rear of said working vehicle;
   a rear-PTO drive train interlocking between said PTO transmission shaft and said rear-PTO shaft;
   a rotative input member of said mid-PTO drive train and a rotative input member of said rear-PTO drive train pivoted around said PTO transmission shaft; and
   a PTO clutch mechanism, which is disposed between said rotative input members and said PTO transmission shaft, which has a position wherein only said mid-PTO shaft is driven, a position wherein only said rear-PTO shaft is driven, a position wherein both said PTO shafts are driven, and a neutral position wherein neither said PTO shafts is driven.

8. A transmission for a working vehicle as set forth in claim 7, further comprising:

a PTO transmission gear which is driven by said input shaft, pivoted around said PTO transmission shaft, wherein said PTO transmission gear is connected with said PTO transmission shaft by a one-way clutch.

9. A transmission for a working vehicle as set forth in claim 7, further comprising:

an idle gear which is provided in a drive train of said running speed changing unit so as to be regularly driven during rearward travel, pivoted around said PTO transmission shaft, wherein said idle gear is connected with said PTO transmission shaft through a one-way clutch so as to transmit power from said input shaft to said PTO transmission shaft.

10. A transmission for a working vehicle comprising:

a PTO transmission shaft to which power is transmitted from an engine;

a mid-PTO shaft for driving a working machine attached to a belly portion of the working vehicle;

a mid-PTO drive train interlocking said PTO transmission shaft and said mid-PTO shaft;

a rear-PTO shaft for driving a second working machine attached to a rear of said working vehicle;

a rear-PTO drive train interlocking said PTO transmission shaft and said rear-PTO shaft;

a PTO clutch mechanism, which is provided around said PTO transmission shaft, having a position wherein only said mid-PTO shaft is driven, a position wherein only said rear-PTO shaft is driven, a position wherein both said PTO shafts are driven, and a neutral position wherein neither of said PTO shafts is driven; and a brake unit provided in said mid-PTO drive train to stop said mid-PTO shaft.

11. A transmission for a working vehicle as set forth in claim 10, wherein said brake unit automatically acts to stop said mid-PTO shaft when said PTO clutch mechanism is in said position wherein only said rear-PTO shaft is driven or in said neutral position wherein neither of said PTO shafts is driven.

12. A transmission for a working vehicle as set forth in claim 10, further comprising:

a PTO transmission gear which is driven by an input shaft, pivoted around said PTO transmission shaft, wherein said PTO transmission gear is connected with said PTO transmission shaft through a one-way clutch.

13. A transmission for a working vehicle as set forth in claim 10, further comprising:

a running speed changing unit, which comprises a first speed change section and a second speed change section connected in series, disposed longitudinally with respect to a vehicle body, wherein said mid-PTO drive train is disposed vertically between said first speed change section and said second speed change section.

14. A transmission for a working vehicle as set forth in claim 13, further comprising:

an idle gear which is provided in a drive train of said first speed change section so as to be regularly driven during rearward travel, and is disposed around said PTO transmission shaft, wherein power from an input shaft is transmitted to said PTO transmission shaft through said idle gear.

15. A transmission for a working vehicle as set forth in claim 14, wherein said idle gear is pivoted around said PTO transmission shaft and connected therewith through a one-way clutch.

16. A transmission for a working vehicle as set forth in claim 10, wherein said PTO clutch mechanism comprises;

a rotative input member of said mid-PTO drive train and a rotative input member of said rear-PTO drive train independently pivoted around said PTO transmission shaft, in a row; and a clutch slider, which can independently engage with and disengage from either of said rotative input members, said clutch slider being axially, slidably disposed around said PTO transmission shaft and non-rotatably disposed with respect to said PTO transmission shaft.

17. A transmission for a working vehicle comprising:

a mid-PTO shaft for driving a working machine attached to a belly portion of the working vehicle;

a rear-PTO shaft for driving a second working machine attached to a rear of said working vehicle;

a brake unit capable of stopping said mid-PTO shaft; and a PTO clutch mechanism disposed around a PTO transmission shaft, which has a position wherein only said mid-PTO shaft is driven, a position wherein only said rear-PTO shaft is driven, a position wherein both said PTO shafts are driven and a neutral position wherein neither of said PTO shafts is driven;

wherein said brake unit and said PTO clutch mechanism are connected with each other so that said brake unit automatically acts to stop said mid-PTO shaft when said PTO clutch mechanism is positioned so that only said rear-PTO shaft is driven or in said neutral position wherein neither of said PTO shafts is driven.

18. A transmission for a working vehicle as set forth in claim 17, wherein a transmission casing which houses said transmission also houses said brake unit and a link mechanism connecting said brake unit with said PTO clutch mechanism.

19. A transmission for a working vehicle comprising:

a PTO transmission shaft to which power is transmitted from an engine through a main clutch;

a mid-PTO shaft to which rotation is transmitted from said PTO transmission shaft to drive a working machine attached to a belly portion of the working vehicle;

a rear-PTO shaft to which rotation is transmitted from said PTO transmission shaft to drive a second working machine attached to a rear portion of said working vehicle;

a brake unit capable of stopping said mid-PTO shaft, wherein said brake unit is connected with said main clutch so as to stop said mid-PTO shaft when said main clutch is disengaged; and a PTO clutch mechanism which has a position wherein only said mid-PTO shaft is driven, wherein only said rear-PTO shaft is driven, wherein both said PTO shafts are driven and a neutral position wherein neither of said PTO shafts is driven;

wherein said PTO clutch mechanism is connected with said brake unit in such a manner that said brake unit keeps on acting, without regard to a main clutch position, when said PTO clutch mechanism is positioned wherein only said rear-PTO shaft is driven or in said neutral position wherein neither of said PTO shafts is driven.

20. A transmission for a working vehicle as set forth in claim 19, wherein a transmission casing which houses said transmission also houses said brake unit and a link mechanism connecting said brake unit with said PTO clutch mechanism.

* * * * *

UNITED STATES PATENT AND TRADEMARK OFFICE
CERTIFICATE OF CORRECTION

PATENT NO. : 5,947,218

DATED : September 7, 1999

INVENTORS : Ishimaru

It is certified that an error appears in the above-identified patent and that said Letters Patent is hereby corrected as shown below.

Title page, item [73],
In the Assignee section, please replace "Kobyukoki" with --Kokyukoki--.

Signed and Sealed this

Seventh Day of March, 2000

Attest:

Attesting Officer

Q. TODD DICKINSON

Commissioner of Patents and Trademarks